US010229824B2

(12) United States Patent
Spencer et al.

(10) Patent No.: US 10,229,824 B2
(45) Date of Patent: Mar. 12, 2019

(54) CHEMICAL ANALYSIS INSTRUMENT WITH MULTI-PURPOSE PUMP

(71) Applicant: 1st Detect Corporation, Houston, TX (US)

(72) Inventors: Michael Spencer, Manvel, TX (US); Warren Mino, Friendswood, TX (US); David Rafferty, Webster, TX (US)

(73) Assignee: 1st Detect Corporation, Austin, TX (US)

( * ) Notice: Subject to any disclaimer, the term of this patent is extended or adjusted under 35 U.S.C. 154(b) by 332 days.

(21) Appl. No.: 13/794,378

(22) Filed: Mar. 11, 2013

(65) Prior Publication Data

US 2014/0250977 A1 Sep. 11, 2014

(51) Int. Cl.
*G01N 30/72* (2006.01)
*H01J 49/24* (2006.01)

(52) U.S. Cl.
CPC .................................... *H01J 49/24* (2013.01)

(58) Field of Classification Search
CPC .... G01N 30/7206; G01N 30/72; G01N 30/74; G01N 30/025
USPC ........................................................ 73/23.37
See application file for complete search history.

(56) References Cited

U.S. PATENT DOCUMENTS

| | | | | |
|---|---|---|---|---|
| 3,968,675 | A * | 7/1976 | Briggs | 73/1.06 |
| 5,313,061 | A | 5/1994 | Drew et al. | |
| 5,859,433 | A | 1/1999 | Franzen | |
| 6,351,983 | B1 | 3/2002 | Haas et al. | |
| 6,528,784 | B1 * | 3/2003 | Tang et al. | 250/282 |
| 2004/0183010 | A1 * | 9/2004 | Reilly | H01J 49/0418 250/288 |
| 2012/0138790 | A1 * | 6/2012 | Wright et al. | 250/288 |
| 2012/0180576 | A1 | 7/2012 | Rafferty et al. | |
| 2012/0223226 | A1 | 9/2012 | Rafferty et al. | |
| 2012/0270334 | A1 | 10/2012 | Ojeda et al. | |
| 2014/0033835 | A1 * | 2/2014 | Hendrikse | H01J 49/049 73/863.12 |

* cited by examiner

*Primary Examiner* — John Fitzgerald
*Assistant Examiner* — Rodney T Frank
(74) *Attorney, Agent, or Firm* — Finnegan, Henderson, Farabow, Garrett & Dunner LLP

(57) ABSTRACT

A mass spectrometer for analyzing a sample may include an analysis chamber for analyzing the sample and a first vacuum pump operably connected to the analysis chamber, wherein the first vacuum pump operates to create a first vacuum state. The mass spectrometer may also include a sample-preparation chamber operably connected to the analysis chamber and a second vacuum pump that operates to create a second vacuum state, wherein the first vacuum state is a lower pressure than the second vacuum state. The second vacuum pump may be operably connected to the first vacuum pump in a first configuration, and the second vacuum pump may be operably connected to the sample-preparation chamber in a second configuration.

20 Claims, 3 Drawing Sheets

CHEMICAL ANALYSIS INSTRUMENT WITH MULTI-PURPOSE PUMP

FIELD OF THE DISCLOSURE

Embodiments of the present disclosure relate to, among other things, chemical analysis instruments and, in particular, to a mass spectrometer with a multi-purpose pump.

BACKGROUND OF THE DISCLOSURE

Chemical analysis tools such as gas chromatographs ("GC"), mass spectrometers ("MS"), ion mobility spectrometers ("IMS"), and various others, are commonly used to identify trace amounts of chemicals, including, for example, chemical warfare agents, explosives, narcotics, toxic industrial chemicals, volatile organic compounds, semi-volatile organic compounds, hydrocarbons, airborne contaminants, herbicides, pesticides, and various other hazardous contaminant emissions. Mass spectrometers measure the atomic mass of a material's constituent molecules and report the masses of these molecules and their relative abundance. This information is used to identify the material. Mass spectrometers may be considered the gold standard for chemical analysis.

In mass spectrometry, a sample is ionized, the ions are separated according to their mass-to-charge ratio by using, e.g., an ion trap, and the separated ions are detected using a suitable detector. Mass spectrometers and/or their components generally operate under a vacuum environment, typically requiring pressures in the range of $10^{-3}$ to $10^{-8}$ Torr for proper operation. Mass spectrometers employ pumps, often a system of at least one vacuum pump, to achieve these pressures, and the pumps may account for much of the size, weight, and cost of mass spectrometers. The pumps also tend to consume large amounts of power and generate both heat and noise when operating.

As chemical analysis becomes a more routine part of many industries, a need has developed for smaller, lighter, more rugged, less complex, mass spectrometers that can be incorporated more easily into laboratory and industrial settings and that have both lower initial instrument costs and lower continued operating costs. Further, in situations requiring chemical analysis, it may be desirable to identify an unknown material quickly and efficiently on location. For example, when potential explosives, narcotics, or hazardous contaminants are discovered, investigators may not have time to send a sample off-site for testing and wait for results. For example, it may be desirable for airport security to carry an instrument capable of detecting the presence of explosive material. It may be advantageous for first responders to carry instruments to determine what chemicals are present at fires, crime scenes, or other emergency situations. Further, it may be desirable for health care professionals to carry a portable instrument to a patient's bedside to analyze a sample for the presence of certain chemicals. Thus, a need also exists for a portable chemical analysis instrument capable of quickly and accurately identifying trace amounts of materials. Accordingly, a need exists in the field of chemical analysis for a miniature mass spectrometer that is lightweight, accurate, efficient, and cost effective.

Embodiments of the disclosure described herein may overcome at least some of the disadvantages of the prior art.

SUMMARY OF THE DISCLOSURE

Embodiments of the present disclosure relate to chemical analysis instruments, such as mass spectrometers having a multi-purpose pump. Various embodiments of the disclosure may include one or more of the following aspects.

In accordance with one embodiment, a mass spectrometer may include an analysis chamber for analyzing a sample and a first vacuum pump operably connected to the analysis chamber, wherein the first vacuum pump operates to create a first vacuum state. The mass spectrometer may also include a sample-preparation chamber operably connected to the analysis chamber and a second vacuum pump that operates to create a second vacuum state, wherein the first vacuum state is a lower pressure than the second vacuum state. The second vacuum pump may be operably connected to the first vacuum pump in a first configuration, and the second vacuum pump may be operably connected to the sample-preparation chamber in a second configuration.

Various embodiments of the mass spectrometer may include one or more of the following features: the first vacuum pump may be a turbomolecular pump, and the second vacuum pump may be a diaphragm pump; the mass spectrometer may contain only two vacuum pumps the first vacuum pump and the second vacuum pump; the mass spectrometer may include a sample chamber operably connected to the sample-preparation chamber, wherein the second vacuum pump is used to evacuate the sample-preparation chamber; a controller may be configured to switch between the first configuration and the second configuration; a first valve may be located between the first vacuum pump and the second pump, such that the first vacuum pump is operably connected to the second vacuum pump by operation of the first valve, and a second valve may be located between the second vacuum pump and the sample-preparation chamber, such that the second vacuum pump is operably connected to the sample-preparation chamber by operation of the second valve, wherein the controller may open the first valve and close the second valve in the first configuration, and close the first valve and open the second valve in the second configuration; and during the first configuration, the second vacuum pump may be operated before the first vacuum pump is operated, such that the second vacuum pump evacuates the analysis chamber and the first vacuum pump further evacuates the analysis chamber to the first vacuum state.

In accordance with another embodiment, a chemical analysis instrument may include an analysis chamber and a first vacuum pump operably connected to the analysis chamber and configured to create a vacuum within the analysis chamber. The instrument may further include a pre-concentrator operably connected to the analysis chamber and configured to provide the sample to the analysis chamber and a multi-purpose roughing pump operably connected to the first vacuum pump and operably connected to the pre-concentrator. A first valve may be located along the connection between the roughing pump and the first vacuum pump and a second valve may be located along the connection between the roughing pump and the pre-concentrator, wherein the chemical analysis instrument is capable of a first and a second configuration by operation of the first and second valves.

Various embodiments of the instrument may include one or more of the following features: when the first valve is open and the second valve is closed, the roughing pump may be configured to back the first vacuum pump in a first configuration and when the first valve is closed and the second valve is open, the roughing pump may be configured to create a vacuum in the pre-concentrator in the second configuration; a sample chamber may be operably connected to the pre-concentrator, wherein the roughing pump is used to cause a sample to move from the sample chamber to the pre-concentrator and to evacuate the pre-concentrator; a third valve may be located along the connection between the pre-concentrator and the sample chamber and a fourth valve may be located along the connection between the pre-concentrator and the analysis chamber, wherein during the second configuration, the third valve is open and the fourth valve is closed and the roughing pump is configured to move a sample from the sample chamber to the pre-concentrator, wherein during a third configuration, the third valve is closed and the fourth valve is closed and the roughing pump is configured to evacuate the pre-concentrator, and wherein during a fourth configuration, the first valve is open, the second valve is closed, the third valve is closed, and the fourth valve is open and the roughing pump is configured to back the first vacuum pump such that the sample is moved from the pre-concentrator to the analysis chamber; and a controller may be configured to switch the first valve, the second valve, the third valve, and the fourth valve between the first configuration, the second configuration, the third configuration, and the fourth configuration.

In accordance with another embodiment, a method of analyzing a chemical sample using the instrument may include: configuring the instrument to operate in the first configuration, initiating the roughing pump to create a rough vacuum pressure, initiating the first vacuum pump to create a first vacuum state, wherein the pressure of the first vacuum state is lower than the rough vacuum pressure, configuring the instrument to operate in the second configuration, evacuating the pre-concentrator, configuring the instrument to operate in the fourth configuration, causing the sample to move from the pre-concentrator to the analysis chamber, and analyzing the sample; and the method may further include configuring the instrument to operate in the first configuration after analyzing the sample and repeating the method.

In accordance with another embodiment, a method of operating a chemical analyzer device may include operating a first vacuum pump to create a vacuum within an analysis chamber and using a roughing pump to back the first vacuum pump, isolating the roughing pump from the first vacuum pump while the first vacuum pump is still operating, and operating the roughing pump to move a sample into the sample-preparation chamber. The method may further include isolating the roughing pump from the sample-preparation chamber, re-connecting the roughing pump to the first vacuum pump, using the roughing pump to back the first vacuum pump, and moving the sample from the sample-preparation chamber into the analysis chamber.

Various embodiments of the mass spectrometer may include one or more of the following features: isolating the roughing pump may include closing a first valve located along a connection between the first vacuum pump and the roughing pump; using the roughing pump to create a vacuum within the sample-preparation chamber may include opening a second valve located along a connection between the roughing pump and the sample-preparation chamber; moving the sample through the sample-preparation chamber may include opening a third valve located along a connection between the sample-preparation chamber and a sample source; isolating the roughing pump from the sample-preparation chamber and re-connecting the roughing pump to the first vacuum pump may include closing the second valve and opening the first valve; and moving the sample from the sample-preparation chamber into the analysis chamber may include opening a fourth valve located along a connection between the sample-preparation chamber and the analysis chamber.

BRIEF DESCRIPTION OF THE DRAWING

The accompanying drawings illustrate certain embodiments of the present disclosure, and together with the description, serve to explain principles of the present disclosure.

DETAILED DESCRIPTION OF THE EMBODIMENTS

Figure 1:
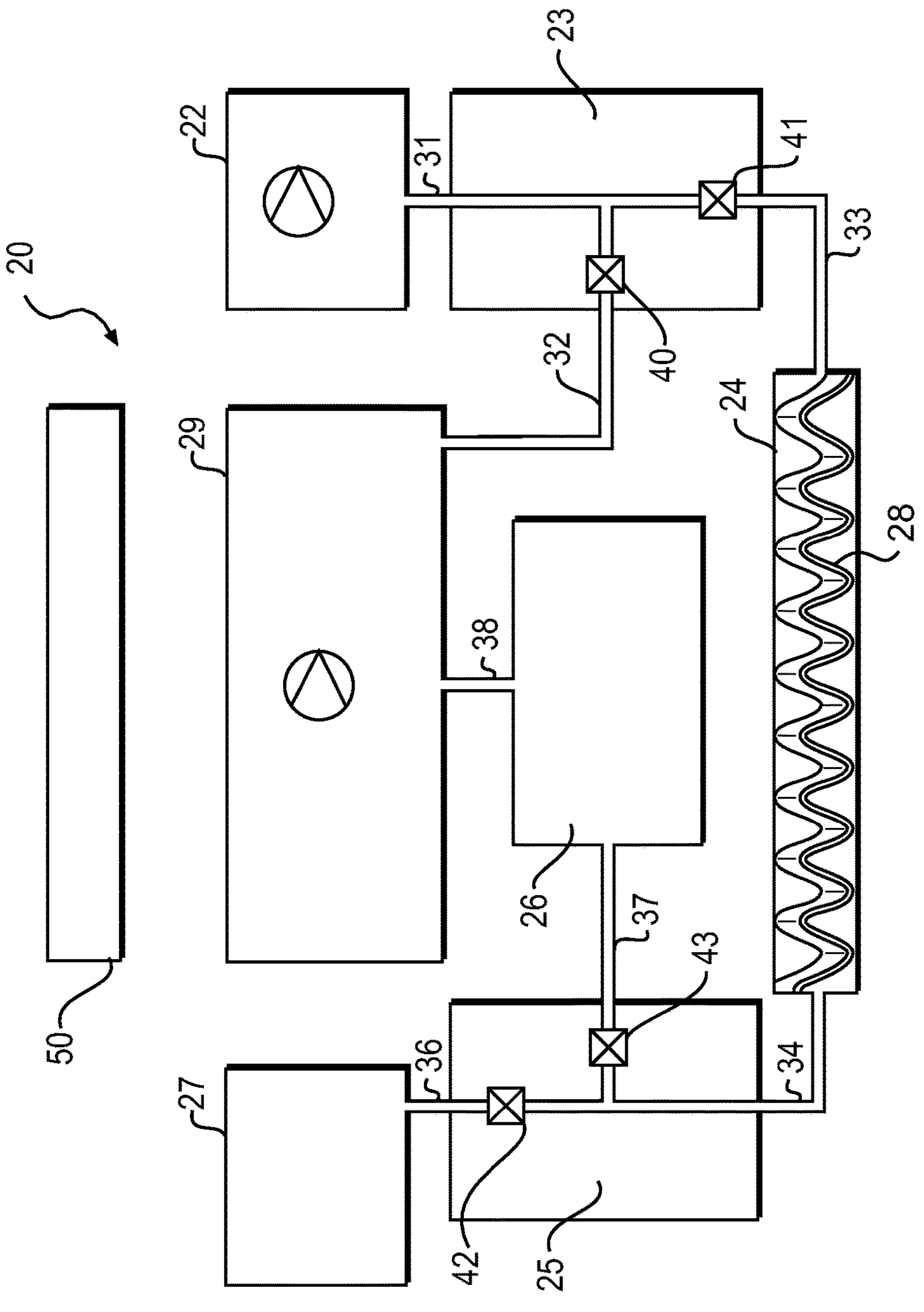
FIG. 1 depicts a schematic view of an exemplary chemical analysis system, in accordance with an embodiment of the present disclosure.

Reference will now be made in detail to the embodiments of the present disclosure described below and illustrated in the accompanying drawings. Wherever possible, the same reference numbers will be used throughout the drawings to refer to same or like parts.

The disclosed embodiments relate to a chemical analysis instrument, such as mass spectrometer. The term "fluid" as used herein may include a state of matter or substance (liquid, gas, or a mixture of liquid and gas), whose particles can move about freely and have no fixed shape, but rather conform to the shape of their containers. The terms "sample," "analyte," "material," "ions," and "chemical" may all be used herein to refer to a substance to be analyzed or identified and may refer to a liquid, a gas, or a solid, and these terms may be encompassed within the term "fluid" to describe the movement of these particles and/or the surrounding gas or liquid. The term "inlet" or "line" may include a passage for fluids to flow through and may be any suitable shape or size. For example, a line may connect two spaced apart components of an exemplary instrument or may be used to refer to a passageway fluidly connecting two adjoining components. The term "vacuum pump" may refer to any suitable pump for creating a high or low vacuum pressure, for example, a roughing pump, a sampling pump, or a turbo-pump.

While the present disclosure is described herein with reference to illustrative embodiments for particular applications, such as mass spectrometers for chemical analysis, it should be understood that the disclosure is not limited thereto. For example, such disclosure may be used in any suitable chemical analysis instrument, for example, gas and liquid chromatographs, ion mobility spectrometers, surface acoustic wave sensors, electrochemical cells, and optical spectrometers (e.g., Raman, UV-VIS, NIR, and similar chemical detectors). For applications involving light, embodiments of the present disclosure could be used to limit unwanted absorption of photons by air molecules, humidity, etc., for example, in photoionization, desorption, and spectroscopic applications. In these and other applications, a multi-purpose pump could be used to transport a sample and/or reduce pressure within the instrument to enhance irradiation by limiting interfering molecules. Additionally, embodiments of the disclosure may be used in any suitable instruments, such any laboratory, industrial, or commercial instruments, that employ one or more pumps to create a vacuum.

Those having ordinary skill in the art and access to the teachings provided herein will recognize additional modifications, applications, embodiments, and substitutions of equivalents all fall within the scope of the invention. Accordingly, the disclosure is not to be considered as limited by the foregoing or following descriptions. Other features and advantages and potential uses of the present disclosure will become apparent to someone skilled in the art from the following description of the disclosure, which refers to the accompanying drawings.

While some chemical analysis instruments may operate close to atmospheric pressure, some components of mass spectrometers may require a vacuum environment in the range of approximately 1 Torr to $10^{-8}$ Torr for proper operation. Achieving a vacuum may require the use of pumps, and these pumps may account for much of the size, weight, power consumption, and cost of a mass spectrometer. Thus, to decrease, for example, the size of a mass spectrometer, the present disclosure describes a novel, multi-purpose pumping system.

In an exemplary embodiment, FIG. 1 depicts a chemical analysis system 20, such as, e.g., a mass spectrometer. System 20 may include a roughing pump 22, a turbomolecular pump (herein referred to as a turbo-pump) 29, a sample-preparation chamber, such as a pre-concentrator 24, an analyte chamber 26, and a sample chamber 27. System 20 may further include a valve system 23 and a valve system 25 configured to direct the flow of fluids through system 20, and a controller 50 operably coupled to system 20 to control valve systems 23 and 25, and thus, control the connection of various components and the flow of fluids, as will be described in further detail below.

To achieve a desired operating pressure for chemical analysis, a series of pumps may be employed. Pumps capable of producing higher vacuum ranges typically operate inefficiently and/or malfunction at atmospheric pressures, whereas pumps that may work efficiently at atmospheric pressures may not be capable of producing low enough vacuum pressures, e.g., lower than approximately $10^{-3}$ Torr, that may be needed for mass spectrometry. Thus, system 20 may include a pump to decrease the pressure within a portion of system 20 to a smaller vacuum (create a 'rough' vacuum), and then may use a second type of high-vacuum pump to achieve a larger vacuum.

System 20 may include any suitable high-vacuum pump, such as a turbo-pump or a diffusion pump. In the exemplary embodiment, system 20 includes a turbo-pump 29. Turbo-pumps achieve larger vacuum ranges by using a rapidly spinning turbine rotor to push gas molecules from a vacuum side to an exhaust side in order to create or maintain a vacuum. Turbo-pumps generally stall if exhausted directly to atmospheric pressure, so they may be exhausted to a lower grade vacuum created by a mechanical pump, such as a roughing pump. System 20 may include a roughing pump 22 connected in series to turbo-pump 29. As used herein, the term "roughing pump" generally refers to a vacuum pump used to lower pressure from one pressure state (typically atmospheric pressure) to a lower pressure state (e.g., at which turbo-pump 29 may operate and may further lower the pressure to a desired vacuum state). Roughing pump 22 may be implemented by using any suitable pump, for example, a skimmer pump, a diaphragm pump, a rotary vane pump, or a scroll pump.

Figure 2:
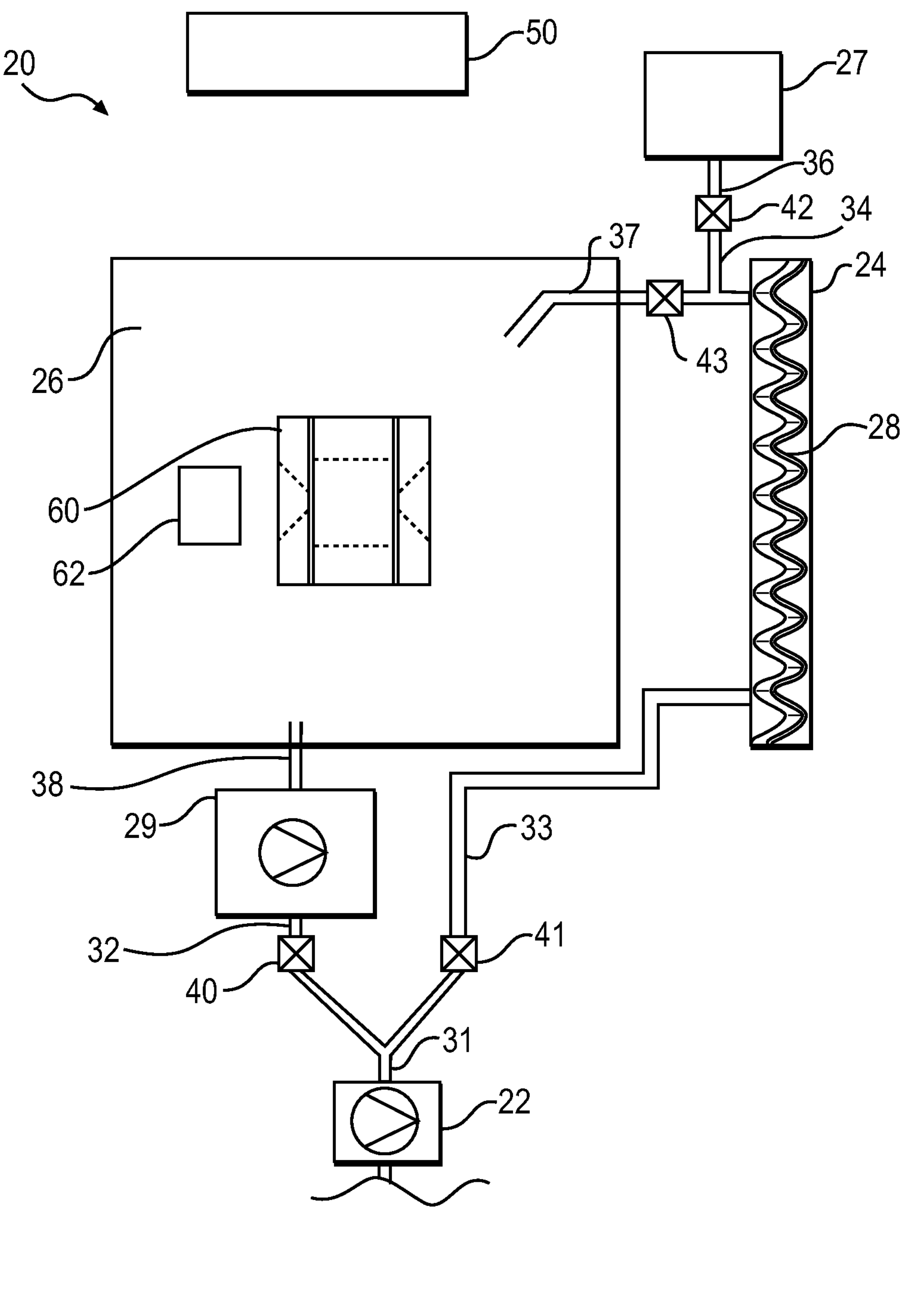
FIG. 2 depicts a schematic view of an exemplary chemical analysis system, in accordance with an embodiment of the present disclosure.

As shown in FIGS. 1 and 2, roughing pump 22 and turbo-pump 29 may be connected in series with each other via vent line 32, allowing turbo-pump 29 to vent to roughing pump 22 at a pressure lower than atmospheric pressure. In turn, turbo-pump 29 may be operably connected to analysis chamber 26 via line 38. Roughing pump 22 may be used to create a small vacuum to which turbo-pump 29 may exhaust. Because roughing pump 22, turbo-pump 29, and analysis chamber 26 are fluidly connected in series, by lowering the exhaust pressure of turbo-pump 29, roughing pump 22 may also lower the pressure in analysis chamber 26. Once the exhaust pressure for turbo-pump 29 and the pressure in analysis chamber 26 has been lowered by roughing pump 22 to a pressure suitable for turbo-pump 29 to operate effectively, turbo-pump 29 may be initiated and used to create a higher vacuum within analysis chamber 26. In some embodiments, turbo-pump 29 and roughing pump 22 may begin operating at substantially the same time, and roughing pump 29 may simply begin operating effectively to create a higher vacuum once roughing pump 22 achieves a suitable pressure. In some embodiments, the pressure within analysis chamber 26, turbo-pump 29, or any suitable line between them, may be measured to determine whether an appropriate pressure has been reached for initiating turbo-pump 29. In other embodiments, whether roughing pump 22 has achieved a desired vacuum pressure may be determined based on the amount of time that roughing pump 22 has been operating for or the power consumption of roughing pump 22. For example, roughing pump 22 may consume less power as it achieves a greater drop in pressure.

Analysis chamber 26 may be formed of any suitable container capable of maintaining a vacuum and may house any suitable apparatuses for performing chemical analysis. In the exemplary embodiment of FIG. 2, analysis chamber 26 may include an ion trap 60 configured to contain or create ions in a vacuum environment created by the vacuum pumps within analysis chamber 26. Ion trap 60 may be any suitable type of ion trap, including, e.g., a Penning trap, a Paul trap (also known as a quadrupole ion trap), a Kingdon trap, or a Orbitrap, and may employ electric or magnetic fields for operation. In one embodiment, analysis chamber 26 may include a 3-dimensional quadrupole or cylindrical ion trap. Analysis chamber 26 may also include a suitable detector 62 for detecting ions ejected from ion trap 60. Analysis chamber 26 may be coupled to a sample inlet 37 configured to direct a sample into analysis chamber 26 and ion trap 60.

Analysis chamber 26 may receive a sample from a sample-preparation chamber, such as pre-concentrator 24, which in some configurations of system 20, may allow sample to exit pre-concentrator 24 through conduit 34 and valve 43 and flow into sample inlet 37 to enter analysis chamber 26. In some embodiments, an additional flow control device, such as, for example, a flow restrictor, a pressure barrier, a barrier membrane, a pulse valve, or any suitable component, may be included between pre-concentrator 24 and analysis chamber 26, to affect the flow of analyte. Analysis chamber 26 may alternately employ a mass filter for mass analysis, such as a quadrupole filter, DMS device, sector device, or any other chemical analysis device requiring reduced pressure for operation.

As used herein, the term "pre-concentrator" refers to a device or component that is used to increase the apparent concentration of a sample before the sample's introduction into an analysis chamber. In some embodiments, any other suitable sample-preparation chamber may be used in addition to or instead of pre-concentrator 24. For example, system 20 may include any suitable evacuated desorber or soil sampler, e.g. A sample-preparation chamber may be configured to receive a sample material and prepare the sample for introduction to analysis chamber 26 and/or pre-concentrator 24. Preparing the sample may include, e.g., increasing the apparent concentration of sample ions, sorting or selectively capturing types or amounts of ions, and controlling the release of ions into analysis chamber 26. In some embodiments, a sample-preparation chamber may be configured for use with external ionization. In some embodiments, pre-concentrator 24 may include an elongated container defining a flow path and a sorptive heating element 28, such as a conductive, undulating mesh strip, extending along the flow path. Sorptive heating element 28 may have a coating for sorbing target chemicals for analysis.

Pre-concentrator 24 may also be fluidly connected to a sample chamber 27 via lines 34 and 36. Sample chamber 27 may be enclosed, or may be open to the environment, e.g., for headspace sampling or other suitable applications. In some embodiments, system 20 may eliminate sample chamber 27, or sample chamber 27 may be configured as an inlet into which sample can enter system 20. For example, a sample of ambient air or soil from the environment may be directly drawn into system 20 without first being introduced or stored in sample chamber 27. Sample chamber 27 may be a rigid structure or a flexible structure, such as, e.g., a tedlar bag. If sample chamber 27 is rigid and enclosed, then the sample may be moved and the sample-preparation chamber (such as pre-concentrator 24) may be evacuated at once. Pre-concentrator 24 may be configured to receive a flow of sample material from sample chamber 27, which may be drawn across the surface of sorptive heating element 28. In embodiments without sample chamber 27, line 36, valve 42, pre-concentrator 24, or any other suitable portion of system 20 may be configured to introduce a sample from the surrounding environment into pre-concentrator 24.

As the sample flows through pre-concentrator 24, one or more chemicals may be sorbed by the coating on sorptive heating element 28. Exemplary pre-concentrators 24 are described in commonly assigned U.S. Patent Publication Nos. 2012/0223226 and 2012/0270334, which are both incorporated herein by reference in their entirety. Once a desired amount of chemical has been sorbed, the flow of sample material may be stopped and pre-concentrator 24 may then be evacuated using a vacuum pump, or combination of pumps, to create a vacuum. Once a desired pressure is reached, the chemical analyte may be desorbed by heating the sorbtive heating element 28 and released into analysis chamber 26 through sample inlet 37.

Pre-concentrator 24 is thus also fluidly connected to a vacuum pump. The vacuum pump may be used to initiate the flow of sample through pre-concentrator 24 and to evacuate pre-concentrator 24. These steps may occur simultaneously (e.g., in the case of a rigid, closed sample chamber 27), or may occur sequentially. Mass spectrometers typically include a separate pump dedicated to assist in moving and/or preparing the sample prior to introduction of the sample into the analysis chamber. As discussed above, a high-vacuum pump, like a turbo-pump or diffusion pump, may be connected to the analysis chamber to create a high vacuum pressure within the analysis chamber for chemical identification. Yet, as discussed previously, high-vacuum pumps typically cannot operate near atmospheric pressure without shutting down or malfunctioning, and so must exhaust to a roughing pump, which creates a suitable, lower pressure. Thus, to maintain proper operation, the traditional belief is that a turbo-pump requires continuous roughing pump operation to maintain a vacuum and avoid malfunction. Accordingly, mass spectrometers generally include one or more high-vacuum pumps each configured to vent to a roughing pump to prepare the analysis chamber, as well as one or more separate roughing pumps for, e.g., initiating the flow of a sample and/or for evacuating a sample-preparation chamber, like pre-concentrator 24. The use of multiple pumps adds to the overall size, weight, and power consumption of mass spectrometers, but has been considered a standard, necessary practice for mass spectrometry for the reasons described above.

By contrast, embodiments of the present disclosure use the same roughing pump 22 both to 'back' turbo-pump 29 and to control the flow of sample through pre-concentrator 24. The inventors of the present disclosure surprisingly discovered that turbo-pump 29 may be isolated from roughing pump 22 for a period of time while continuing to operate. While the accepted understanding in the field is that isolating turbo-pump 29 from roughing pump 22 may cause malfunction of turbo-pump 29, the inventors have successfully configured system 20 to achieve temporary isolation, allowing roughing pump 22 to be used for multiple purposes. Thus, during this time, roughing pump 22 may be used to move the sample from sample chamber 27 through pre-concentrator 24 and then to evacuate pre-concentrator 24 to a desired pressure. To accomplish this, a flow control device, such as a valve 40, may be placed in-line between roughing pump 22 and turbo-pump 29. By closing valve 40, turbo-pump 29 may be isolated from roughing pump 22 and may continue to operate for a period of time, e.g., for between approximately 4 to 10 minutes, depending on the types of pumps used and the operating conditions.

Roughing pump 22 may also be fluidly connected to pre-concentrator 24. While turbo-pump 29 is isolated, valve 41 may open to connect roughing pump 22 with pre-concentrator 24 at one end region. During this time, a valve 42 connecting sample chamber 27 to another end region of pre-concentrator 24 may open. Thus, roughing pump 22, pre-concentrator 24, and sample chamber 27 may be fluidly connected in series at this point, and the vacuum created by roughing pump 22 may draw the sample from sample chamber 27 through pre-concentrator 24. Once a desired amount of sample has been drawn through pre-concentrator 24, roughing pump 22 may then be used to evacuate pre-concentrator 24. Once these steps are performed, valve 41 may be closed, valve 40 may be opened, and roughing pump 22 may again be isolated from pre-concentrator 24 and re-connected to turbo-pump 29. Sample may then be introduced to analysis chamber 26 for identification via valve 43 and sample inlet 37. This novel, multi-step pumping configuration may allow system 20 to include a single turbo-pump 29 and a single, multi-purpose roughing pump 22, without the need for a separate sampling flow pump, thus reducing the size, weight, cost, and/or power consumption of the disclosed chemical analysis instrument 20.

To facilitate the step-wise isolation and connection of pumps within the instrument and to control the steps of the analysis process, system 20 may further include a controller 50. Controller 50 may be configured to control the pump configurations within system 20 and to direct, initiate, and cease, the flow of fluids through system 20. In some embodiments, controller 50 may be coupled to flow control device actuators in valve systems 23 and 25, for example, valve actuators configured to open and close flow control devices, such as, e.g., valves. Controller 50 may transmit control signals to corresponding components of system 20, e.g., valve actuators, to direct the flow of fluids. To transmit signals, controller 50 may be wirelessly coupled to one or more components of system 20 or may be physically connected, via, e.g., a cable or wire, to one or more components of system 20. Controller 50 may include a programmable logic controller or embedded microcontroller, such as, e.g., a field programmable gate array or a uC, to control performance of sample preparation and chemical analysis. In some embodiments, controller 50 may include hardwired logic circuitry or analog circuitry, a computer, a processor, a memory, or a combination thereof. In one exemplary embodiment, controller 50 may include a Pentium-based computer running Linux.

It should be appreciated that system 20 may be automated through the use of controller 50, may be manual, or may be a combination of the two. User input for automated or manual systems may consist of any suitable means for inputting commands into a control system, for example, operating at least one button, switch, lever, or trigger, or through voice or motion activation, a touch screen, or a combination thereof. Moreover, automated portions of system 20 may include override mechanisms that allow a user to interrupt control of controller 50 over system 20.

Figure 3:
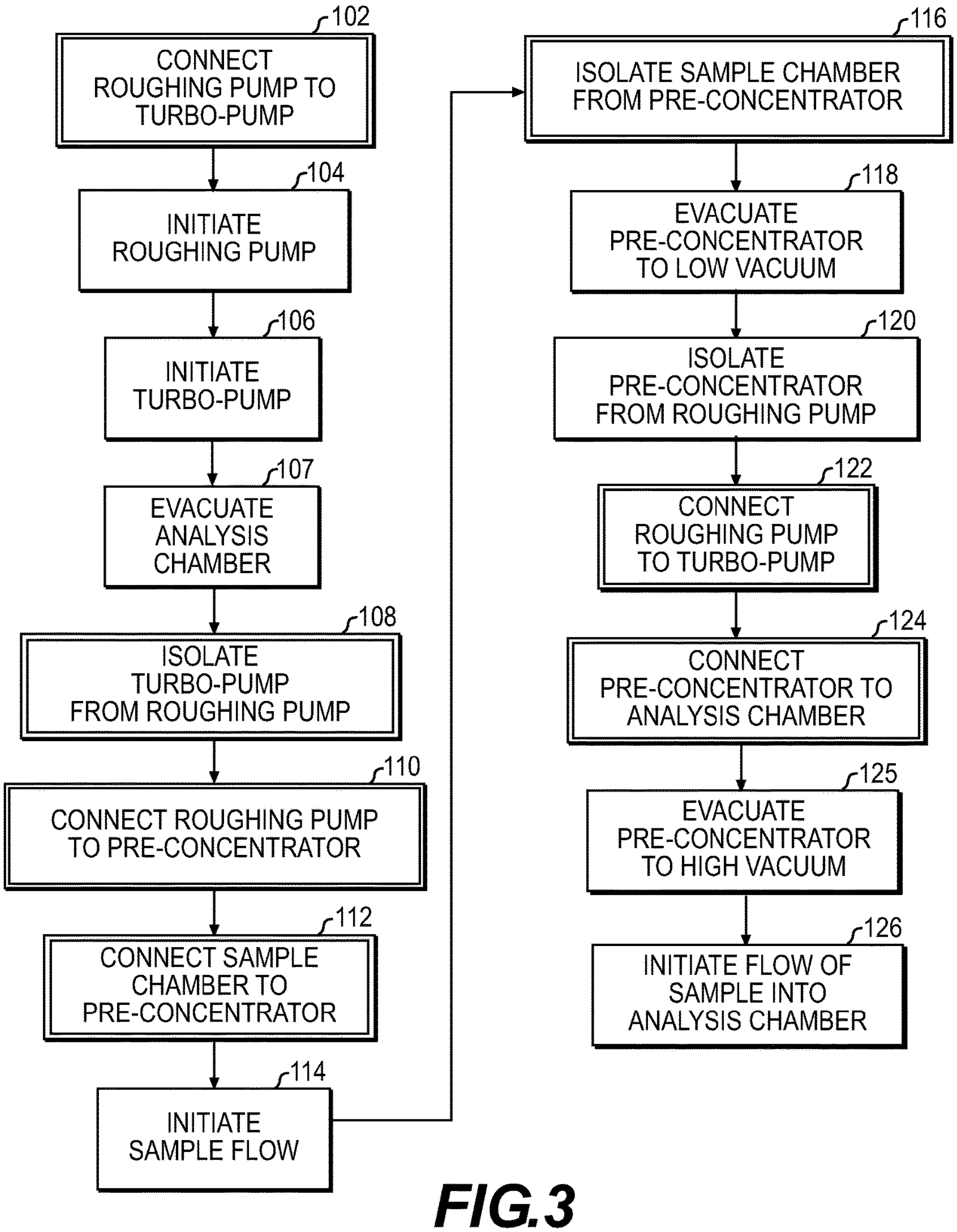
FIG. 3 depicts a flow diagram illustrating the operation of an exemplary chemical analysis system, in accordance with an embodiment of the present disclosure.

FIG. 3 illustrates an exemplary technique for operating system 20 to analyze a chemical. Controller 50 may first close valve 41 and open valve 40 to connect roughing pump 22 to turbo-pump 29 (step 102), initiate roughing pump 22 (step 104), and initiate turbo-pump 29 (step 106). In this configuration, roughing pump 22 is connected to turbo-pump 29, and roughing pump 22 may be used to achieve a 'rough vacuum' pressure in an exhaust region of turbo-pump 29 that is low enough for turbo-pump 29 to operate effectively. Because roughing pump 22, turbo-pump 29, and analysis chamber 26 may be fluidly connected in series at this point, roughing pump 22 may also decrease the pressure within analysis chamber 26. Next, once roughing pump 22 has achieved a suitable operating pressure in an exhaust region of turbo-pump 29 and in analysis chamber 26 for turbo-pump 29 to operate effectively, turbo-pump 29 may begin further reducing the pressure in chamber 26 to a suitable vacuum pressure (step 107). Controller 50 may then close valve 40, isolating turbo-pump 29 from roughing pump 22 (step 108). System 20 may now employ roughing pump 22 to prepare and move a sample for analysis. Controller 50 may open valve 41, connecting roughing pump 22 to an end region of pre-concentrator 24 (step 110), and may open valve 42 connecting sample chamber 27 to an opposite end region of pre-concentrator 24 (step 112). Valve 43 may remain closed at this point, preventing the sample from entering analysis chamber 26 and helping to maintain the vacuum within analysis chamber 26. At this stage, roughing pump 22 may create a vacuum sufficient to pull sample material from sample chamber 27 and initiate a flow of analyte into pre-concentrator 24 (step 114), where it may be prepared for analysis. For example, the sample may be drawn across a coated, mesh sorptive heating element 28 in pre-concentrator 24 and sorbed along the mesh. At this stage, a current may be generated to heat the mesh and/or the analyte to provide a constant temperature or to intentionally prevent, limit, or promote the binding of certain analytes in pre-concentrator 24.

Once a desired amount of sample has been removed from sample chamber 27 into pre-concentrator 24, controller 50 may close valve 42 to prevent additional sample from entering pre-concentrator 24 (step 116). Valve 41 may remain open, and roughing pump 22 may begin evacuation, lowering the pressure in pre-concentrator 24 and creating a vacuum (step 118). This may be the first evacuation stage, and roughing pump 22 may create a vacuum suitable to expose to analysis chamber 26 without increasing the pressure in the analysis chamber too much, so as to cause the turbo-pump to fail. Such a vacuum may be, e.g., in the range of approximately 0.1 to 20 Torr. At the second evacuation and analysis stage, controller 50 may close valve 41 to isolate pre-concentrator 24 from roughing pump 22 (step 120), and may open valve 40. This may re-connect roughing pump 22 with turbo-pump 29 (step 122). Controller 50 may also open valve 43 to connect pre-concentrator 24 to analysis chamber 26 (step 124). Turbo-pump 29 may continue to evacuate analysis chamber 26 and evacuate pre-concentrator 24 to a high vacuum, which may be, e.g., approximately $10^{-3}$ to $10^{-8}$ Torr (step 125). After reaching the desired pressure, pre-concentrator 24 may be activated to release the sample into analysis chamber 26 for chemical analysis and identification (step 126). In some embodiments, components within pre-concentrator 24, such as sorptive heating element 28, may be energized to promote the release of the sample from pre-concentrator 24 into analysis chamber 26.

Thus, in the exemplary system, roughing pump 22 may serve multiple purposes and system 20 may be capable of multi-step pumping. Roughing pump 22 may serve to create a low enough pressure for turbo pump 29 to operate, and roughing pump 22 may also be used to move and prepare the sample. Embodiments of the present disclosure have successfully achieved temporary isolation of turbo-pump 29 from roughing pump 22 without interrupting or jeopardizing proper operation of turbo-pump 29 while multi-purpose roughing pump 22 is employed for different uses in a mass spectrometer. Thus, one roughing pump may be used in place of multiple pumps to achieve these different goals, decreasing the size, cost, weight, and energy consumption of system 20.

Further, one or more components of system 20 may include one or more sensors for detecting a given state. This information may be monitored, e.g., continuously or intermittently, to determine the stage of operation of system 20, to monitor the overall operation, or to indicate to controller 50 or a user any suitable data. For example, any chamber, line, or valve in system 20 may include a pressure gauge, a volumetric flow control reader, or a thermometer. Any suitable device to detect any suitable parameter may be operably coupled to any suitable component in system 20. In some embodiments, controller 50 may use, e.g., readings from a pressure gauge coupled to a chamber, to determine whether a desired pressure has been achieved and whether to initiate the next step in sample analysis. Alternatively, as discussed above, a user may direct the process depicted in FIG. 3 instead of, or in addition to, controller 50, and the user may monitor the readings of one or more sensors to operate the chemical analysis instrument. For example, such sensors may provide audio and/or visual signals to a device operator. In some embodiments, the vacuum pumps themselves may be used to determine approximate pressures by monitoring pump parameters including, e.g., electrical power draw, rpm, or any suitable combination thereof.

Portions of inlets and lines described in this embodiment are listed as discrete sections for convenience. Inlets and lines connecting the components of system 20 may be either continuous or discrete sections fluidly connected. Additionally, the inlets and lines may include any suitable number or type of valves. System 20 may include, for example, 1-way or multi-way valves, pulsing valves, or any combination thereof. Additionally, the components listed here may be replaced with any suitable component capable of performing the same or like functions. Different embodiments may alter the arrangement of steps or components, and the invention is not limited to the exact arrangements described herein. Some steps may be eliminated or combined, and the steps of the exemplary methods may be repeated any suitable number of times.

Other embodiments of the disclosure will be apparent to those skilled in the art from consideration of the specification and practice of the disclosure herein. It is intended that the specification and examples be considered as exemplary only, with a true scope and spirit of the invention being indicated by the following claims.

What is claimed is:

1. A mass spectrometer for analyzing a sample, comprising:

an analysis chamber for analyzing the sample;

a first vacuum pump operably connected to the analysis chamber, wherein the first vacuum pump operates to create a first vacuum state;

a sample-preparation chamber operably connected to the analysis chamber, the sample-preparation chamber including a sorbent material;

a second vacuum pump operably connected to the sample-preparation chamber, wherein the second vacuum pump operates to create a second vacuum state, the first vacuum state having a lower pressure than the second vacuum state; and a first valve located between the first vacuum pump and the second vacuum pump, such that the first vacuum pump is operably connected to the second vacuum pump by operation of the first valve, wherein the first valve is operated to isolate the first vacuum pump from the second vacuum pump for a first period of time during which the second vacuum pump is configured to:

evacuate the sample-preparation chamber to create the second vacuum state in the sample-preparation chamber; and move the sample into the sample-preparation chamber such that at least a portion of the sample is sorbed by the sorbent material, and wherein the first valve is operated to connect the first vacuum pump to the second vacuum pump for a second period of time during which the first vacuum pump is configured to:

evacuate the analysis chamber to create the first vacuum state in the analysis chamber; and move the sample from the sample-preparation chamber into the evacuated analysis chamber after at least a portion of the sample is desorbed from the sorbent material in the sample-preparation chamber.

2. The mass spectrometer of claim 1, wherein the first vacuum pump is a turbomolecular pump and the second vacuum pump is a diaphragm pump.

3. The mass spectrometer of claim 1, wherein the mass spectrometer contains only two vacuum pumps, the first vacuum pump and the second vacuum pump.

4. The mass spectrometer of claim 1, further comprising a sample chamber containing the sample, wherein the sample chamber is operably connected to the sample-preparation chamber, and wherein the second vacuum pump is configured to move the sample from the sample chamber into the sample-preparation chamber.

5. The mass spectrometer of claim 1, further comprising a controller configured to switch between a first configuration and a second configuration, wherein the second vacuum pump is operably connected to the first vacuum pump in the first configuration, and wherein the second vacuum pump is operably connected to the sample-preparation chamber in the second configuration.

6. The mass spectrometer of claim 5, further including:

a second valve located between the second vacuum pump and the sample-preparation chamber, such that the second vacuum pump is operably connected to the sample-preparation chamber by operation of the second valve, wherein the controller opens the first valve and closes the second valve in the first configuration, and wherein the controller closes the first valve and opens the second valve in the second configuration.

7. The mass spectrometer of claim 6, wherein during the first configuration, the second vacuum pump is operated before the first vacuum pump is operated, such that the second vacuum pump evacuates the analysis chamber and the first vacuum pump further evacuates the analysis chamber to the first vacuum state.

8. A chemical analysis instrument for analyzing a sample, the chemical analysis instrument comprising:

an analysis chamber;

a first vacuum pump operably connected to the analysis chamber and configured to create a vacuum within the analysis chamber;

a pre-concentrator operably connected to the analysis chamber and configured to provide the sample to the analysis chamber, the pre-concentrator including a sorbent material;

a multi-purpose roughing pump operably connected to the first vacuum pump and operably connected to the pre-concentrator; and a first valve located along a connection between the multi-purpose roughing pump and the first vacuum pump, wherein the first valve is configured to isolate the first vacuum pump from the multi-purpose roughing pump for a first period of time during which the multi-purpose roughing pump is configured to:

evacuate the pre-concentrator; and move the sample into the pre-concentrator such that at least a portion of the sample is sorbed by the sorbent material, and wherein the first valve is operated to connect the first vacuum pump to the multi-purpose roughing pump for a second period of time during which the first vacuum pump is configured to:

evacuate the analysis chamber; and move the sample from the sample-preparation chamber into the evacuated analysis chamber after at least a portion of the sample is desorbed from the sorbent material in the sample-preparation chamber.

9. The chemical analysis instrument of claim 8, further comprising a second valve located along a connection between the multi-purpose roughing pump and the pre-concentrator;

wherein when the first valve is open and the second valve is closed, the multi-purpose roughing pump is configured to back the first vacuum pump in a first configuration; and wherein when the first valve is closed and the second valve is open, the multi-purpose roughing pump is configured to create a vacuum in the pre-concentrator in a second configuration.

10. The instrument of claim 9, further comprising a sample chamber operably connected to the pre-concentrator, wherein the roughing pump is configured to move a sample from the sample chamber to the pre-concentrator.

11. The chemical analysis instrument of claim 9, further comprising a third valve located along a connection between the pre-concentrator and the sample and a fourth valve located along a connection between the pre-concentrator and the analysis chamber, wherein during the second configuration, the third valve is open and the fourth valve is closed such that the multi-purpose roughing pump is configured to move the sample into the pre-concentrator, wherein during a third configuration, the third valve is closed and the fourth valve is closed and the multi-purpose roughing pump is configured to evacuate the pre-concentrator, and wherein during a fourth configuration, the first valve is open, the second valve is closed, the third valve is closed, and the fourth valve is open and the multi-purpose roughing pump is configured to back the first vacuum pump such that the sample is moved from the pre-concentrator to the analysis chamber.

12. The chemical analysis instrument of claim 11, further comprising a controller configured to switch the first valve, the second valve, the third valve, and the fourth valve among the first configuration, the second configuration, the third configuration, and the fourth configuration.

13. A method of analyzing a chemical sample using the chemical analysis instrument of claim 12, the method comprising:

configuring the chemical analysis instrument to operate in the first configuration;

initiating the multi-purpose roughing pump to create a rough vacuum pressure;

initiating the first vacuum pump to create a first vacuum state, wherein the pressure of the first vacuum state is lower than the rough vacuum pressure;

configuring the chemical analysis instrument to operate in the second configuration;

causing the sample to move into the pre-concentrator;

configuring the chemical analysis instrument to operate in the third configuration;

evacuating the pre-concentrator;

configuring the chemical analysis instrument to operate in the fourth configuration;

causing at least a portion of the sample to move from the pre-concentrator to the analysis chamber; and analyzing the sample.

14. The method of claim 13, wherein after analyzing the sample, the chemical analysis instrument is configured to operate in the first configuration and the method is repeated.

15. A method of operating a chemical analyzer device for analyzing a sample, the method comprising:

creating, by a first vacuum pump, a vacuum within an analysis chamber;

backing the first vacuum pump with a roughing pump;

isolating the roughing pump from the first vacuum pump while the first vacuum pump is still operating;

moving, by operating the roughing pump, a sample into the sample-preparation chamber such that at least a portion of the sample is sorbed by a sorbent material in the sample-preparation chamber;

isolating the roughing pump from the sample-preparation chamber;

re-connecting the roughing pump to the first vacuum pump;

backing the first vacuum pump with the reconnected roughing pump;

heating the sorbent material to desorb at least a portion of the sample; and moving the desorbed sample from the sample-preparation chamber into the analysis chamber.

16. The method of claim 15, wherein isolating the roughing pump includes closing a first valve located along a connection between the first vacuum pump and the roughing pump.

17. The method of claim 15, wherein using the roughing pump to create a vacuum within the sample-preparation chamber includes opening a second valve located along a connection between the roughing pump and the sample-preparation chamber.

18. The method of claim 15, wherein moving the sample into the sample-preparation chamber includes opening a third valve located along a connection between the sample-preparation chamber and the sample.

19. The method of claim 15, wherein isolating the roughing pump from the sample-preparation chamber and re-connecting the roughing pump to the first vacuum pump includes closing the second valve and opening the first valve.

20. The method of claim 15, wherein moving the sample from the sample-preparation chamber into the analysis chamber includes opening a fourth valve located along a connection between the sample-preparation chamber and the analysis chamber.

* * * * *